United States Patent [19]

Novick et al.

[11] 4,195,582
[45] Apr. 1, 1980

[54] SEWING MACHINE STITCHING CONTROL SYSTEM

[75] Inventors: Sheldon Novick, Flying Hills; Carl M. Wenrich, Shillington, both of Pa.

[73] Assignee: Teledyne Mid-America Corporation, Los Angeles, Calif.

[21] Appl. No.: 942,369

[22] Filed: Sep. 14, 1978

[51] Int. Cl.$^2$ ............................................ D05B 19/00
[52] U.S. Cl. ............................ 112/121.11; 112/275; 112/317
[58] Field of Search ................. 112/121.11, 121.12, 112/275, 277, 316, 317; 318/568

[56] References Cited

U.S. PATENT DOCUMENTS

| | | | |
|---|---|---|---|
| 3,074,632 | 1/1963 | Braun et al. | 112/121.11 X |
| 4,104,976 | 8/1978 | Landau, Jr. et al. | 112/275 X |

*Primary Examiner*—Peter P. Nerbun
*Attorney, Agent, or Firm*—Edelson and Udell

[57] ABSTRACT

An adjunct control system for electronically controllable sewing machines which increases the flexibility of the sewing system by providing the functions of mechanically programmable stitch counting for each of a predetermined number of stitching sequences, programmable needle positioning, reverse stitching, thread trimming and wiping, and manually selected program interruption for selected conditions. A micro-processor auxiliary control system is utilized which is interfaced with a standard commercially available sewing machine control system in such manner that the sewing machine may be used in either its standard mode of operation without the micro-processor control, or may be used under micro-processor control. The micro-processor includes a central processing unit, a program memory, read/write storage, a control decoder and input/output devices for accessing the CPU and for interchanging control signals between the micro-processor and the standard sewing machine control system.

17 Claims, 4 Drawing Figures

| FIG.2A | FIG.2B |

SEWING MACHINE STITCHING CONTROL SYSTEM

This invention relates generally to sewing machines, and more particularly relates to automatically controlled sewing machines. In the past, sewing machines have been known of the type having electronically controllable variable sewing speeds with or without needle positioning, thread trimming, thread wiping, presser foot lift and reverse sewing or back tacking. The present invention provides an adjunct control system for electronically controllable sewing machines of the aforesaid type which increases the flexibility of the sewing system by providing the functions of (a) mechanically programmable stitch counting for each of a predetermined number of stitching sequences, (b) programmable needle positioning as related to the completion of selected stitch sequences, (c) programmable thread trimming and wiping as related to needle positioning.

(d) programmable reverse stitching.

(e) manually selected program interruption for selected conditions such as thread breakage, bobbin thread exhaust, loss of air pressure in systems utilizing pneumatic controls, and so forth, (f) generation of programmable auxiliary signals indicating program events such as signals indicating the particular stitch sequence, signals indicating forward or backward stitching.

The invention is implemented by the utilization of a micro-processor auxiliary control system which is interfaced with a standard commercially available sewing machine control system in such manner that the sewing machine may be used in either its standard mode of operation without the micro-processor control, or may be used under micro-processor control. The micro processor includes a central processing unit, a program memory, read/write storage, a control decoder and input/output devices for accessing the CPU and for interchanging control signals between the micro-processor and the standard sewing machine control system. Accordingly, it is a primary object of the invention to provide a novel sewing machine stitching control system which makes it possible to program the sewing machine to automatically stitch a sequence consisting of a predetermined number of stitches and to cause the sewing machine to automatically stop at the end of that sequence.

Another object of the invention is to provide a novel sewing machine stitching control system as aforesaid in which a plurality of such stitching sequences may be provided, each sequence being of any desired number of stitches in length.

A further object of the invention is to provide a sewing machine stitching control system as aforesaid in which any desired number of the stitching sequences may be programmed to be either forward stitching or reverse stitching.

Yet another object of the invention is to provide a novel sewing machine stitching control system as aforesaid in which the programmed automatic stitching sequence may be interrupted at any point with transfer of machine control to the operator, and wherein machine control may be subsequently retransferred from the operator to the automatic program.

A still further object of the invention is to provide a novel sewing machine stitching control system as aforesaid in which the needle position may be programmed with respect to the completion of selected different stitch sequences.

The foregoing and other objects of the invention will become clear from a reading of the following specification in conjunction with an examination of the appended drawings, wherein.

In the several figures, like elements are denoted by like reference characters.

Figure 1:
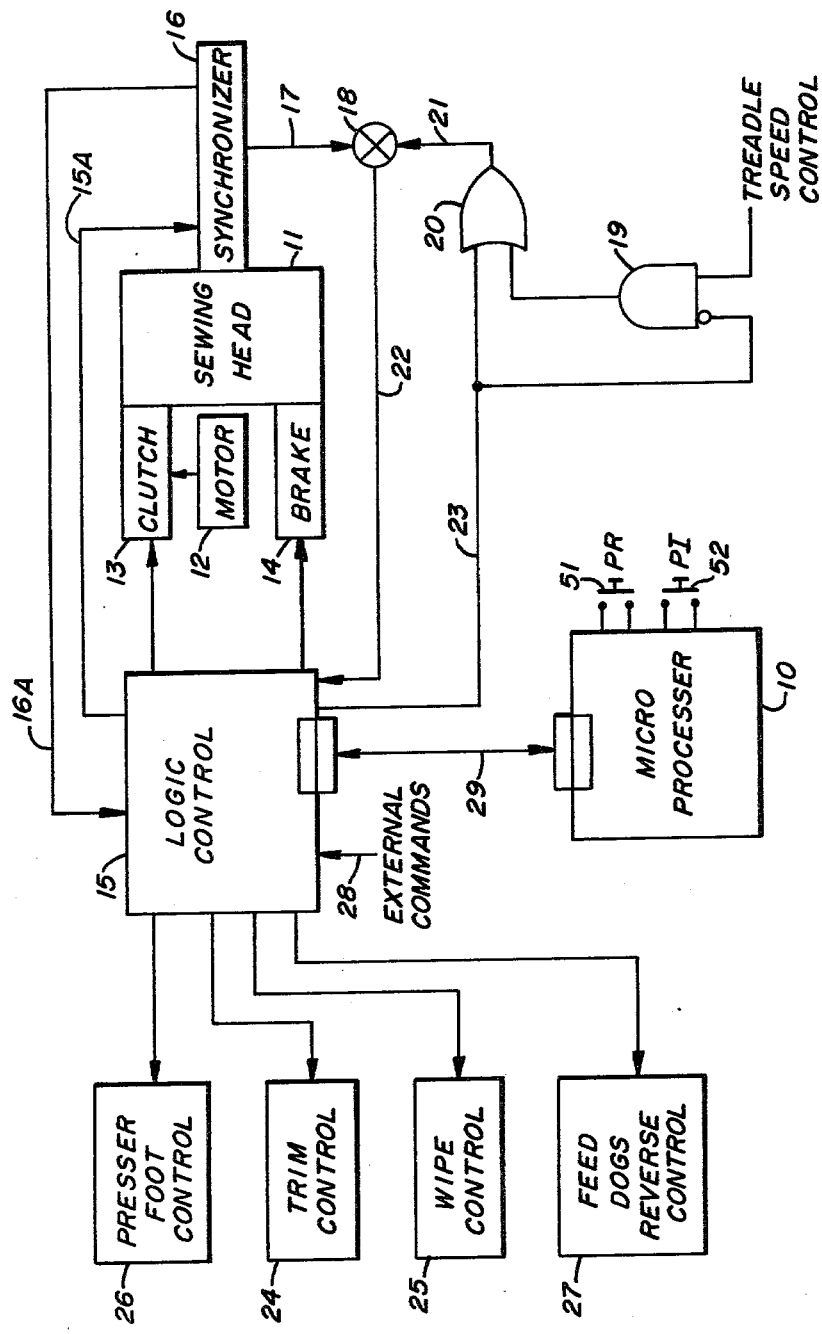
FIG. 1 shows a function block diagram of the overall system illustrating the interconnection between the micro-processor and the normal sewing machine logic control package.

Referring first to the generalized functional block diagram of FIG. 1, the normal Variostop system without control by Micro-processor 10 functions in the well known manner in which the sewing head 11 is driven by a continuously running motor 12 through a clutch 13 and brake 14 mechanism which latter are both controlled by the electronic Logic Control 15. The Logic Control 15 sends signals to the Synchronizer 16 via line 15A to control the position in which the needle stops. The synchronizer 16 attached to the sewing machine head indicates at all times to the Logic Control 15 the position of the needle via line 16A and generates a signal on line 17 which is proportional to the speed of the sewing machine. The signal generated by the synchronizer which indicates the speed of the sewing machine is compared by a standard error signal generator 18 with a signal received normally from the treadle switch under control of the operator via AND gate 19 and OR gate 20 and line 21, and any difference in speed between that called for by the operator and that at which the sewing machine is running produces an error signal on line 22 which causes the electronic Logic Control 15 to either clutch the drive motor in more firmly to increase the speed of the sewing machine or cause the brake to be applied and the clutch to be disengaged to brake the sewing machine. The net effect of the operation of the electronic Logic Control 15 is to reduce the error signal toward zero so that the sewing machine operates at the speed called for by the operator through the treadle switch. The Logic Control 15 also generates a positioning speed control signal on line 23 which overides the treadle speed control signal by inhibiting AND gate 19 and passing to the error signal generator 18 via OR gate 20 to control the error signal resultant on line 22.

The machine performs the following functions, which are well known, as selected by external commands routed by the Logic Control on input lines 28: sews at a called for speed and stops with the sewing machine needle in the down position; sews at a called for speed and then stops with the needle in the up position followed by thread trimming and wiping utilizing the trim and wipe controls 24 and 25; raising of the presser foot with the needle in down position so that work can be turned around the needle utilizing the presser foot control 26; raising of the presser foot when the needle is stopped in the up position and trimming is to occur; reverse stitching or back tacking utilizing the feed dogs reverse control 27. The foregoing functions are presently carried out by known types of sewing machine controllers and are not per se considered to be part of the invention.

Figures 2, 2A:
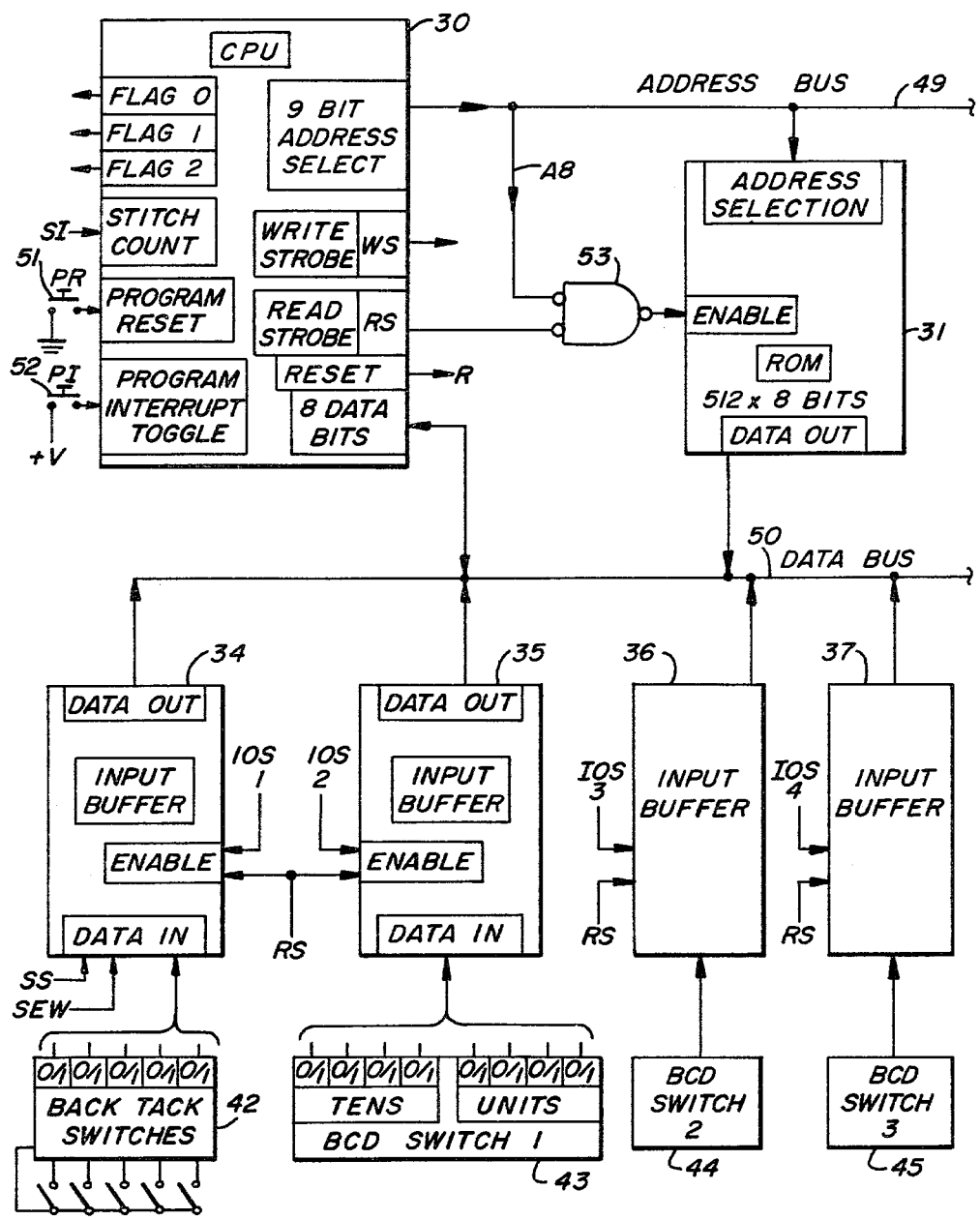
FIGS. 2a and 2b are logic diagrams of the micro-processor.
Figure 2B:
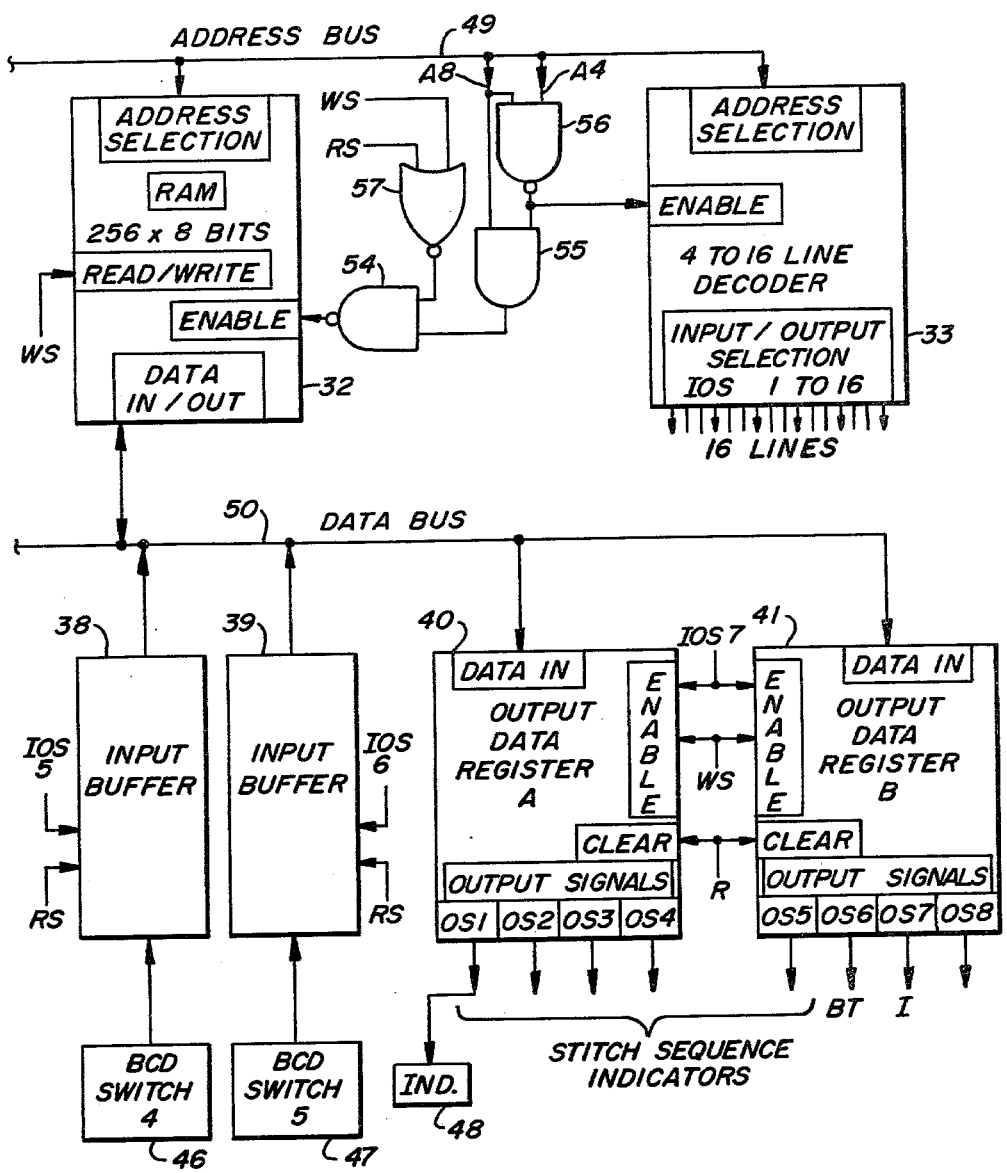

The invention involves the use of Micro-processor auxiliary control system 10 which provides additional functional capability for the sewing machine and which may be interfaced by means of a cable 29 with the standard electronic Logic Control 15 so that the machine may be operated either with or without the auxiliary micro-processor control. When the micro-processor is disconnected from the 6F14 Control, the latter functions in its normal and usual manner. The functions provided by the sewing machine system with the micro-processor control connected are, in addition to the foregoing, the following:

1. Mechanically programmable stitch counting
2. Programmable needle positioning, presser foot position, and thread trimming and wiping
3. Programmable forward and reverse sewing
4. Manually selected program interruption with standby for program reactivation
5. Auxiliary signals generation Before discussing the specific sequences effected by the micro-processor control, the Micro-processor 10 itself should first be examined, and for this purpose reference should be now made to FIG. 2. The Micro-processor 10 consists of a central processing unit (CPU) 30, a read only memory (ROM) 31, a random access memory (RAM) 32, a Decoder 33, and a plurality of Input Buffers 34 through 39 and Output Registers 40 and 41, together with signal generating input devices 42 through 47 and output indicators such as illustratively shown at 48. Except for the input devices and output indicators, the other functional logic devices are interconnected by the Address Bus 49 and Data Bus 50.

The Central Processing Unit 30 is the device which controls all of the operating sequences as directed by the instructions stored in the ROM 31. The CPU is an integrated circuit chip which contains among other things an address generator, registers for storing data read in from the Data Bus and for doing intermediate operations, signal generators for generating signals such as the Write Strobe WS and the Read Strobe RS, a counter and a clock for timing all of the operations carried out. The CPU can for example be a National Semiconductor type SC/MP II or any other suitable unit made by other manufacturers.

The ROM 31 is a read only memory which contains a fixed program that controls the operating sequences through the CPU 30. The addresses which are used to select the ROM are the addresses between 000 and 255. The Enable input requires a low signal which is passed through the AND gate 53 when the low RS and the low A8 signal appear at the inputs. The RS signal is normally a low, whereas the presence of the A8 signal indicates that the address selection is 256 or greater. Accordingly, in order to insure that the count is less than 256 it is necessary that an A8 "not true" condition be noted at the input to gate 53. Therefore the gate input signal will be true on the A8 line as long as the A8 signal is low or in the "not true" state. The ROM 31 could typically be a type MM5204 EPROM manufactured by National Semiconductor and others.

The RAM 32 is a random access memory and is an expandable storage working register into which data and instructions may be written and out of which data and instructions may be read. The addresses of the RAM are those extending from address 256 to address 271, and again a low Enable signal is required. The Enable signal is generated by the proper combination of Write Strobe WS or Read Strobe RS together with proper combinations of the address signals on the address lines A4 and A8 via the AND gates 54,55 and 56, and the OR gate 57. Since both the WS and RS signals are low when true, and a high is required as an input to AND gate 54, the OR gate 57 is an inverter gate. Additionally, a high required at the other input of AND gate 54 from AND gate 55 requires a pair of highs on the input to AND gate 55. Since a high on the A8 line indicates a number greater than 255, this is a required input to gate 55. Additionally, since highs on A8 and A4 indicate an address greater than 271, the presence of that combination on AND gate 56 generates a low out of that gate which will inhibit the AND gate 55 but which will enable the Decoder 33. Accordingly, what is required as RAM enabling inputs to AND gate 55 is the presence of an A8 high signal and the absence of an A4 high signal. The RAM 32 may be suitably structured from two type MM2112 chips each of which is 256 by 4 bits arranged so that there results 256 by 8 bit storage. The MM2112 chip is available from National Semiconductor and Synertek.

The 4 to 16 line Decoder 33 is enabled for addresses 272 to 511 which occur when the A8 and A4 address lines are both high. The selected address generated by the CPU 30 causes the Decoder to generate a corresponding one of the input/output IOS signals IOS 1 to IOS 16, which selectively enable the Input Buffers and Output Registers. The Decoder could typically be a type 74LS154 manufactured by National Semiconductor.

The Input Buffers 34 through 39 read the data onto the Data Buss 50 when they are enabled by the proper Decoder IOS signal and the Read Strobe RS signal. At other times the Input Buffers present a high impedance to the Data Bus. Typically the Input Buffers could be type 81LS95 made by National Semiconductor.

The Output Data Registers 40 and 41 read data out of the Data Bus when enabled by the Decoder and the Write Strobe WS, and at other times present a high impedance to the Data Bus. The Output Data Registers may be type 74LS173 manufactured by National Semiconductor.

The back tack switches 42 are single pole single throw switches of any conventional type. The Binary Coded Decimal switches 43 through 47 are devices having mechanically settable counts by actuation of a thumb wheel. Each position of the thumb wheel generates a particular set of BCD voltage levels as static outputs. These BCD switches may be the type 180002G manufactured by Eeco Switch Company.

Figure 3:
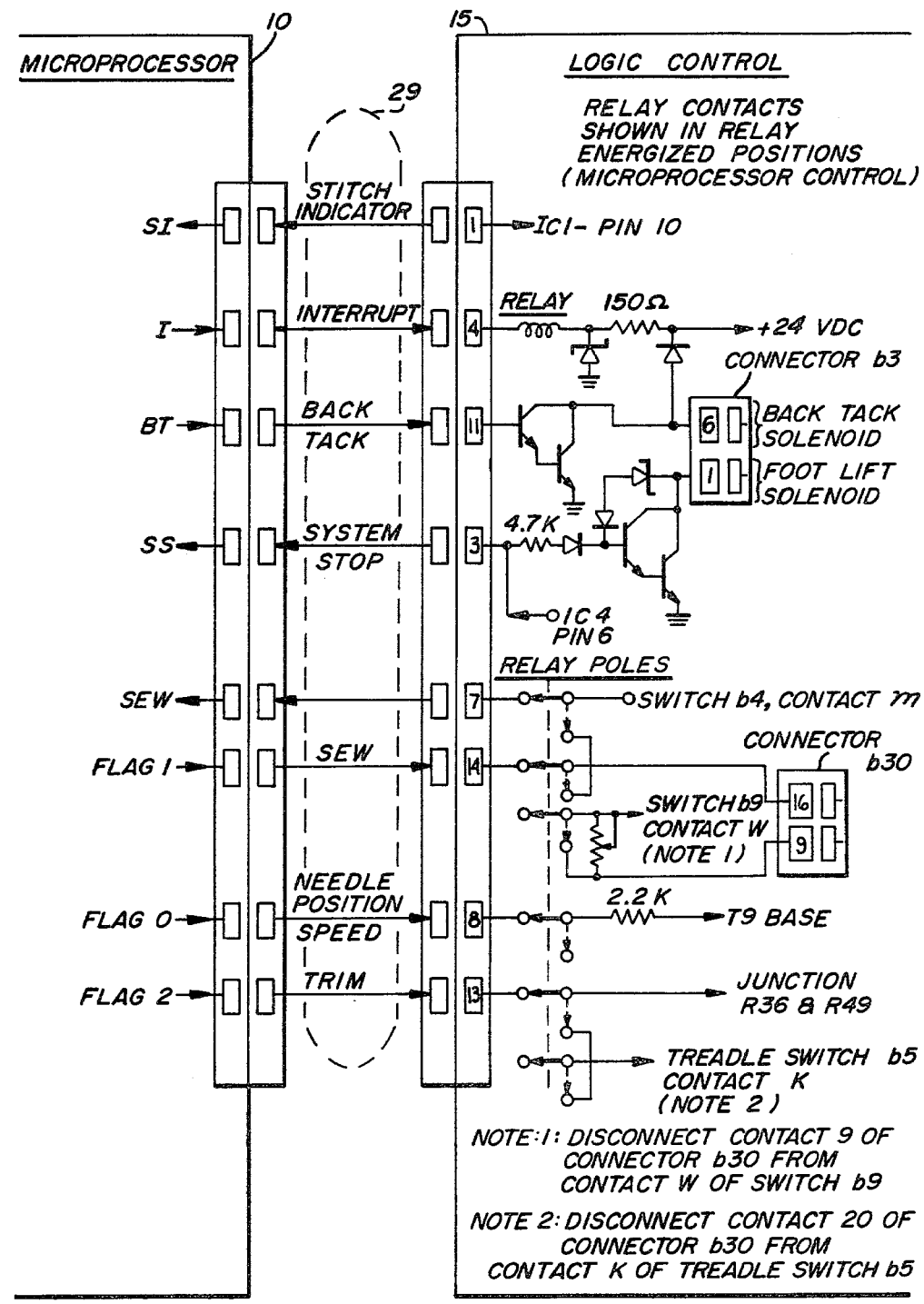
FIG. 3 is a schematic diagram showing the interfacing between the micro-processor and a standard machine control package in which the illustrated logic control package is a model 6F14 Variostop Control box manufactured by Teledyne Amco, Reading, Pennsylvania, FIG. 3 showing the necessary modifications to the 6F14 Control to effect the proper interfacing.

The signals to the micro-processor are either supplied directly by switch inputs such as the PR, PI, BCD and back tack switches or are generated in the Logic Control 15 and routed through the interface connector cable 29. This latter group includes the stitch indicator signal SI from pin 10 of integrated circuit chip IC1 of the logic control circuitry as shown in FIG. 3; the system stop signal SS from pin 6 of integrated circuit chip IC4 of the logic control circuitry; and the SEW signal from contact m of switch b4 of the logic control circuitry. The switches and connectors noted in the interface diagram FIG. 3, such as switches b4, b5 and b9 and connectors b3 and b30 are already existing parts of the 6F14 Variostop Control, as are the components to which connections are noted such as IC1, IC4, transistor T9, resistors R36 and R49, and the 24VDC supply.

The relay actuated by the interrupt signal I from the micro-processor and its associated switch circuits are utilized to switch the circuit connections of the Logic Control 15 between the state of a self-contained functional package independent of micro-processor control and the state in which the micro-processor controls operations. The other signals from the micro-processor to the Logic Control 15 are the back tack signal BT from the Output Data Register 41 and the three flag signals from the CPU30, FLAG 0, FLAG 1 and FLAG 2.

In order to set up a mechanically programmable stitch count, the binary coded decimal switches 43 through 47 are used by the operator. The operator can determine up to five consecutive sewing sequences by using the five BCD switches. Each sequence may either be a forward sewing sequence or a backward sewing sequence. BCD switch 1 is utilized to determine the stitch count during the first stitching sequence, BCD switch 2 is used for the stitch count in the second stitching sequence and so on for five stitching sequences. The five back tack switches 42 correspond one for one to the five BCD switches and determine which if any of the five sewing sequences are reverse sewing. If the switch is open it generates a logical 1 which corresponds to reverse sewing, and if the switch is closed it generates a logical zero which corresponds to forward sewing. As shown in the logic diagram of FIG. 2, all of the back tack switches are open so that now all of the BCD switches 1 to 5 are programmed for reverse stitching. This coding is of course arbitrary, and the switches could just as well be reverse wired.

When it is desired to program into the micro-processor a series of stitching sequences, the following procedure is used. Assuming for the moment that a series of three sewing sequences is desired to be automatically set into the machine so that the machine will carry out the three stitching sequences automatically, the first thing that is done is that the operator sets the number of stitches desired for each sequence into the BCD switches such that BCD switch 1 contains numerically the number of stitches desired during the first stitching sequence, BCD switch 2 has set into it the number of stitches desired during the second sequence, and BCD 3 has the number of stitches set into it desired for the third sequence. The back tack stitches 42 are then set in accordance with whether each sequence is to be a forward stitching or a reverse stitching sequence. The last two BCD switches 4 and 5 would have zeroes set into them.

The binary coded decimal logic levels which appear as outputs from the BCD switches are presented as input signals to the data inputs of the associated input buffers. None of these logic levels which are statically maintained by the BCD switches is able to be transmitted through the input buffers to the Data Bus 50 until the input buffer has been enabled by the receipt of the appropriate enabling signals which include the Read Strobe signal RS and one of the Input/Output Selection signals IOS 1 to 16 from the 4 to 16 line Decoder 33. The Decoder 33 has a larger IOS signal output availability than is shown as utilized in FIG. 2, only seven of the IOS signals being used. The transfer of the data set into the BCD switches and the back tack switches is transmitted through the input buffers under control of a program which is contained in the ROM 31.

To initilize the program, the Program Reset switch 51 is closed which insures that the CPU 9 bit address code is jammed to zero and commences running from that point. The first address causes a Read Strobe RS to be generated which along with the absence of the A8 signal on the Address Bus 49 enables the ROM 31 and causes data read-out onto the Data Bus 50 of a sequence of instructions for the CPU 30, which sets up the CPU to carry out the program.

One of the instructions from the ROM 31 to the CPU 30 is for the CPU to generate the appropriate address on the Address Bus 49 so that the Decoder 33 will generate the IOS 1 through IOS 6 signals in the prescribed sequence, so that the Input Buffers 34 through 39 will be sequentially opened for the data to be read through them onto the Data Bus 50. As each input buffer is enabled and the data reads through onto the Data Bus 50 the data is routed to the 8 Data bits input of the CPU 30 where the BCD switches data are code converted from BCD to hexadecimal system and are then read back out of the CPU onto the Data Bus for inputing to the RAM 32. At the appropriate time the program causes the Write Strobe WS to be generated to place the RAM 32 in write mode and allow the back tack switches binary bits and the code converted data on the Data Bus to be written into the RAM in the address location group between addresses 256 and 271.

The data written into the first RAM memory location, corresponding to address 256, is the group of five signals designating the status of the back tack switches 42. Either a 0 or a 1 is written into the first five bit locations of the 8 bit memory location, bit 1 corresponding to the status of the first back tack switch, bit 2 corresponding to the status of the second back tack switch, and so on. This is then followed in memory location 257 by the 8 bit hexadecimal code corresponding to the two decimal digits set into BCD switch number 1. Memory location 258 then has read into it the hexadecimal code corresponding to the two decimal digits of desired stitch count set into BCD switch number 2, and so on for the next three memory locations corresponding to BCD switches 3,4 and 5. If only a three sequence program is desired, and only BCD switches 1, 2 and 3 are programmed with stitch numbers, then BCD switches 4 and 5 will have 00 set into their counters, it being critical that the 00 count appear in BCD switch number 4 because this information is utilized during the program to signal when the program sequences have been completed.

Additionally, when the Program Reset switch 51 was set it caused the CPU 30 to generate the Reset signal R which clears the outputs of the Output Data Registers 40 and 41 so that the OS 1 through OS 8 signals are cleared to 0. This causes the I signal to be 0, and, from FIG. 3 it will be seen, causes the relay connected to PIN 4 of the 6F14 control connector to be energized. Energization of this relay causes all of the relay switch poles to move into the positions shown in solid line in FIG. 3, and transfer control of the sewing machine to the Micro-processor 10. At this point, the micro-processor is in control of the sewing machine but it is still in Scan mode so that it is possible to change the programming stored in the RAM 32 by changing the positions of the BCD switches 43 through 47 or the back tack switches 42. This Scan mode remains in effect so long as the first Input Buffer 34 does not receive a SEW signal, which latter is transmitted from the 6F14 control via contact 7 when the sewing machine is placed into SEW mode.

The SEW signal is generated under control of the sewing machine operator when ready to finalize the program and start sewing on the item for which the program sequence has been placed into the microprocessor. This is accomplished by just starting to depress the treadle so that a switch contained in the Control 15 is closed, this switch being closable without actually causing the sewing machine clutch to be engaged and drive the stitching mechanism. The closure of that switch, which is switch b4 as shown connected to connector contact 7 in FIG. 3, causes a voltage to be transmitted through connector contact 7 as the SEW signal to the first Input Buffer 34.

When during the Scan cycle the next IOS 1 signal is generated, the SEW signal is passed through the input buffer to the Data Bus 50 and to the CPU 30 which, upon receipt of the SEW signal, causes the program to change, and in the process moves to a program position where no addresses are generated by the CPU which will cause the Decoder 33 to generate the IOS 2 to 6 signals during this portion of the program and the Input Buffers 35 through 39 are effectively locked out. Consequently, the BCD switches 43 through 47 are no longer operative to change the program presently stored in the RAM, and the Scan mode has been terminated.

While the IOS 2 through 6 signals are not generated, the IOS 1 signal must still be generated because the System Stop signal SS has to be available to be examined for, so that the first Input Buffer 34 is not locked out of the system. Even though Input Buffer 34 is not locked out, the rest of the system is not affected by any alteration in the back tack switch positions, because at the time that the System Stop signal SS is looked at nothing is being read out of the RAM during a stitching sequence. Accordingly, whatever might show up on the back tack switch is discarded information at that time. At other times when the System Stop signal SS is not being looked for, the first Input Buffer 34 is closed, so that it doesn't matter what the status of the back tack switches is. That data will be coming from the RAM. Additionally, the programming in the RAM cannot at this point be changed, because when the micro-processor went out of the Scan mode, the Write Strobe WS became "not true" and it no longer was possible to write into the RAM, so that the program stored in the RAM at that time is the program that will be controlling and will not change until further specific steps are taken to change it.

The program after receipt of the SEW signal now shifts to the Run mode and examines memory location 256 of the RAM to determine the forward or reverse SEW information contained in bit 1. If bit 1 is a 0 designating a forward sewing instruction, the CPU sends a signal over the Data Bus to the Output Data Register 40 which jams the OS 1 signal to a "one" state and gives an indication via Indicator 48 that sequence 1 is now in progress. Another signal is also routed from the CPU to the Output Data Register 41 and jams the BT signal to a 0 state, and the CPU then generates the Flag 1 signal. The BT signal being jammed to 0 makes sure that the back tack solenoid controlled by the 6F14 Logic Control 15 remains deenergized so that sewing will proceed in the forward direction. The Flag 1 signal passes to the 6F14 Logic Control via connector contact 14 and causes the commencement of sewing by the machine.

Since the sewing machine cannot be stopped instantaneously, it requires a certain number of stitches to be brought to a complete stop. The 6F14 Logic Control, as is done in all known needle positioners, drops the sewing head from high speed to slow speed or positioning speed before bringing the needle to a stop. At the slow speed, or positioning speed, operation of the sewing head, it will require N stitches to bring the needle to a halt, N being a variable depending upon the particular control system which is involved. Typically, for the Teledyne Variostop control it takes approximately four stitches to completely stop the needle. Accordingly, the CPU reads into an internal register a number corresponding to the stitch count stored in the RAM memory location corresponding to the coded number of stitches which had been programmed in from BCD switch number 1 decreased by the number N.

As each stitch is made by the sewing head, an SI signal is generated, as seen in FIG. 3, which is transmitted via contact 1 of the interface connector and routed to the Stitch Count input of the CPU, and the stitch count stored in the CPU register is decremented by 1 for each stitch count received. When the CPU register count has been reduced to 0, the CPU generates a Flag 0 signal which is transmitted to the 6F14 Logic Control via contact 8 of the interface connector and causes the sewing machine to be driven at needle positioning speed. The CPU then adds the number N into the CPU register and continues decrementing for each received stitch indicator signal SI. When the count in the CPU register again becomes 0, the CPU terminates the Flag 1 signal to stop stitching by the sewing head.

The sewing machine has now stopped in the needle down position, which is normal for a positioner, and due to a signal which arises at PIN 6 of IC 4 when the system stops, as shown at connector contact 3 in FIG. 3, the Foot Lift Solenoid is activated to raise the presser foot. The IC 4 PIN 6 signal also generates the System Stop signal SS through interface connector contact 3 which is routed to the input of the first Input Buffer 34 and which passes therethrough to the CPU.

During the time when slow speed positioning was being carried out, the CPU examined RAM memory location corresponding to the count set in from BCD Switch 2 to see if there is a second stitching sequence to be carried out. If there is a second stitching sequence to be carried out, the needle will be stopped in the down position and the presser foot raised and the system brought to a stop. If there is no next sequence, that is, the sequence being completed is the final sequence in the program, then the processor will cause the sewing machine needle to be stopped in its raised position, cause a thread trimming operation to take place and then raise the presser foot.

Assuming first that there is a sequence to follow so that the sewing machine needle has been stopped in the down position, the operator may now turn the work about the needle to position it for the next stitching sequence, and the next stitching sequence will not commence until the operator again slightly depresses the treadle to cause switch b4 to close as for the first stitching sequence. Upon stopping of the sewing machine, the CPU examines the back tacking memory location of the RAM to determine whether or not a back tacking operation is to be done, and assuming that such is the case for the second sequence, the CPU generates the signal onto the Data Bus which jams the OS 6 output signal of Output Data Register 41 to a high condition, generating the BT signal which is transmitted through connector contact 11 of the interface to the 6F14 Logic Control and energizes the Back Tack solenoid via connector b3 to cause the sewing machine feed dogs to operate in reverse when sewing commences.

The CPU also puts a signal out onto the Data Bus which jams the OS 1 signal to 0 and the OS 2 signal to a 1 state indicating completion of the first sewing sequence and initiation of the second sewing sequence. This second sequence is now carried out in exactly the same way as the first sequence was through to the point of needle positioning and stopping of the sewing operation. Assuming now that all of the sewing sequences that have been programmed have been completed, that is, the present sequence that is being counted down is the final sequence, then examination of the next RAM memory location will disclose a 00 count which will tell the CPU that the present sequence is the final sequence. When the sewing operation has been completed and Flag 1 has been terminated, the CPU generates Flag 2 which causes the trimming operation to take place via interface connector contact 13. The Flag 2 signal causes the 6F14 Logic Control to first cause the sewing needle to be raised and thereafter actuate the thread trimmer.

The final sequence having been completed and the thread having been trimmed, the operator may remove the stitched article from the machine and prepare to place a new article for stitching under the needle and recommence a new programmed stitching cycle. The generation of the Flag 2 signal by the CPU also causes the program to be recycled back to its starting point where the micro-processor is again put into the Scan mode and the output data registers are again cleared by generation of the Reset signal R. The new sewing cycle will be initiated as in the past by operator actuation of the sewing machine foot treadle. The sequence can be repeated as many times as is desired by the operator.

The OS 1 through OS 8 signals from the Output Data Registers 40 and 41 in addition to performing the described functions; can be used for other purposes, as for example providing an indication of the sewing machine status. Such indication, as illustrated by Indicator 48, could be visual, or could be audible. Additionally, these signals could be used for other purposes in a monitoring system.

The manually controlled program interrupt cycle takes place as follows. Assuming that some condition occurs during the course of operation of the sewing machine, such as exhaust of bobbin thread or breakage of the needle thread, the operator wishes to immediately terminate the operation so that the condition can be corrected. This is accomplished by closing of the Program Interrupt switch 52 which generates the PI signal causing the CPU 30 to interrupt the program by exchanging the contents of the program counter with a special CPU register. The program sequence information which was in the program counter is now stored in the special register and the address information in the special register is sent to the program counter. The program counter with the new address stored in it causes the ROM 31 to read out an instruction to the CPU over the Data Bus which causes the CPU to do several things.

First, the CPU reads data out onto the Data Bus 50 to the Output Data Register 41 which causes the OS7 signal, the I signal, to be generated. The I signal just generated is a high signal and deactivates the relay connected to interface connector contact 4 in the Logic Control 15, thereby causing the relay poles, as shown in FIG. 3, to transfer to their dotted line positions and render the sewing machine controllable only by the Logic Control 15, effectively temporarily locking out the micro-processor. At this point, the sewing machine operator can operate the machine as though there were no micro-processor. The CPU now effectively holds everything on standby and continuously examines for the occurrence of another PI signal.

The next PI signal can only be received in response to action taken by the sewing machine operator by again depressing PI switch 52. Until such time as this occurs, the micro-processor is effectively on standby condition. Assuming that the operator has now corrected whatever condition caused the program interruption, wishes to return the machine to micro-processor control, the operator again presses the PI switch 52 generating a PI signal which is received by the CPU 30. Receipt of the second PI signal causes the CPU to examine for the next stitching sequence and determine whether the interrupted sequence was the last sequence in the program or whether there is a subsequent sequence in the program. If the interrupted sequence was the last sequence in the program, then the CPU causes the program to be terminated and returned to the Scan mode for commencement of a new program by the operator when desired.

If the interrupted sequence is not the last sequence in the program, then the CPU causes the program counter information stored in the special register to be changed to the next program location and then causes the new program information to be retransferred to the program counter. At the same time, it causes the program interrupt sub-routing which was in the program counter to be returned to the special register for subsequent use upon the occurrence of another program interrupt signal.

Finally the CPU sends data out on the Data Bus 50 to the Output Data Register 41 which causes the OS7 signal to again go low and suppress the I interrupt signal. When this happens, the interrupt relay in the Logic Control 15 is again energized causing the relay poles to again assume their solid line positions as shown in FIG. 3, and restore control of the sewing machine to the micro-processor. At this point, the sewing machine is in automatic control and waiting to have the next sequence initiated. This is done, as previously described, under control of the sewing machine operator when the operator again slightly depresses the treadle to close switch b4 of the Logic Control 15. Additionally, as also previously described, the CPU 30 has put out data on the Data Bus 50 which is received by the appropriate one of the Output Data Registers 40 and 41 to generate the appropriate one of the OS2 through OS5 stitch sequence indicators identifying the new sequence.

Having now described our invention in connection with a particularly illustrated embodiment thereof, it will be understood that variations and modifications of our invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. A sewing machine stitching control apparatus for use in conjunction with a sewing machine having a sewing head, means for forwardly and reversely stitching and for braking to a stop the needle of the sewing head, and means for signalling the needle position, said control apparatus comprising in combination, (a) selectively operable first means for generating a first stitch signal corresponding to forward or reverse stitching, (b) second means for generating a second stitch signal corresponding to a desired number of stitches to be made by the sewing machine, (c) storage means operatively couplable to said first and second means for storing said first and second stitch signals, (d) command means for generating a command signal directing the commencement of sewing by the sewing head, and (e) control means operatively coupled to said sewing head drive and braking means, said needle position signalling means, said storage means and command means effective responsive to receipt of said command signal to examine said stored first and second stitch signals and automatically actuate said sewing head needle to stitch the number of stitches designated by said second stitch signal in the forward or reverse direction as designated by said first stitch signal, and to automatically stop said sewing head needle when the last of the designated number of stitches has been completed.

2. Control apparatus as defined in claim 1 wherein said first means is manually settable.

3. Control apparatus as defined in claim 1 wherein said second means is manually settable.

4. Control apparatus as defined in claim 1 wherein said first and second means are each manually settable and said command means is actuatable by the sewing machine operator.

5. Control apparatus as defined in claim 1 wherein said control means further includes manually actuatable interrupt means operatively coupled to said control means effective when actuated to interrupt the automatic sewing head operation controlled by said control means and transfer control of said sewing head to the sewing machine operator.

6. Control apparatus as defined in claim 1 wherein said control means further includes manually actuatable interrupt means operatively coupled to said control means, said interrupt means being effective when actuated in a first way to interrupt the automatic sewing head operation controlled by said control means and transfer control of said sewing head to the sewing machine operator, and said interrupt means being effective when actuated in a second way to retransfer control of said sewing head from the sewing machine operator to said control means.

7. Control apparatus as defined in claim 1 wherein said control means further includes,
(a) stitch signal means which generate a stitch indicator signal for each stitch made by the sewing head needle,
(b) counter means responsive to receipt of said stitch indicator signals to count the number of stitches made as they occur,
(c) means effective responsive to a count in said counter means less by a predetermined number than the stitch count represented by said second stitch signal to cause the speed of said sewing head needle to be reduced from normal stitching speed to a slower positioning speed before said needle is stopped by said control means.

8. Control apparatus as defined in claim 1 wherein, said first means is plural and effective to generate a plurality of discrete first stitch signals, said second means is plural and effective to generate a plurality of discrete second stitch signals, said storage means comprises means for separately storing each of said plural first and second stitch signals in a discrete order, each pair of one first stitch signal and one second stitch signal comprising control data for one sewing sequence and determining forward or backward stitching and the number of stitches to be made in that sequence, whereby a plurality of stitching sequences may be carried out in a discrete order.

9. Control apparatus as defined in claim 8 wherein said control means further includes means for carrying out and completing each of said stitching sequences in the said discrete order, each said sequence being initiated by a command signal from said command means.

10. Control apparatus as defined in claim 8 wherein said control means further includes scanning means for examining said storage means during each stitching sequence to determine whether or not there is a subsequent stitching sequence to be carried out, said control means causing an existing subsequent sequence to be carried out when initiated by said command means, and when there is no subsequent sequence causing the first sequence in said discrete order to be carried out when initiated by said command means.

11. Control apparatus as defined in claim 8 wherein said control means further includes,
(a) stitch signal means which generate a stitch indicator signal for each stitch made by the sewing head needle,
(b) counter means responsive to receipt of said stitch indicator signals to count the number of stitches made as they occur,
(c) means effective responsive to a count in said counter means less by a predetermined number than the stitch count represented by said second stitch signal to cause the speed of said sewing head needle to be reduced from normal stitching speed to a slower positioning speed before said needle is stopped by said control means.

12. Control apparatus as defined in claim 8 wherein said first and second means are each manually settable and said command means is actuatable by the sewing machine operator.

13. Control apparatus as defined in claim 8 wherein said control means further includes manually actuatable interrupt means operatively coupled to said control means, said interrupt means being effective when actuated in a first way to interrupt the automatic sewing head operation controlled by said control means and transfer control of said sewing head to the sewing machine operator, and said interrupt means being effective when actuated in a second way to retransfer control of said sewing head from the sewing machine operator to said control means.

14. Control apparatus as defined in claim 10 wherein said control means responsive to said scanning means causes said sewing needle to stop in the down position when a subsequent stitching sequence in said discrete order is determined to exist, and responsive to said scanning means causes said sewing needle to stop in the up position when the last stitching sequence in said discrete order is completed.

15. Control apparatus as defined in claim 11 wherein said control means further includes manually actuatable interrupt means operatively coupled to said control means, said interrupt means being effective when actuated in a first way to interrupt the automatic sewing head operation controlled by said control means and transfer control of said sewing head to the sewing machine operator, and said interrupt means being effective when actuated in a second way to retransfer control of said sewing head from the sewing machine operator to said control means.

16. Control apparatus as defined in claim 11 wherein said control means further includes scanning means for examining said storage means during each stitching sequence to determine whether or not there is a subsequent stitching sequence to be carried out, said control means causing an existing subsequent sequence to be carried out when initiated by said command means, and when there is no subsequent sequence causing the first sequence in said discrete order to be carried out when initiated by said command means.

17. Control apparatus as defined in claim 16 wherein said control means responsive to said scanning means causes said sewing needle to stop in the down position when a subsequent stitching sequence in said discrete order is determined to exist, and responsive to said scanning means causes said sewing needle to stop in the up position when the last stitching sequence in said discrete order is completed.

* * * * *